United States Patent Office 2,754,689
Patented July 17, 1956

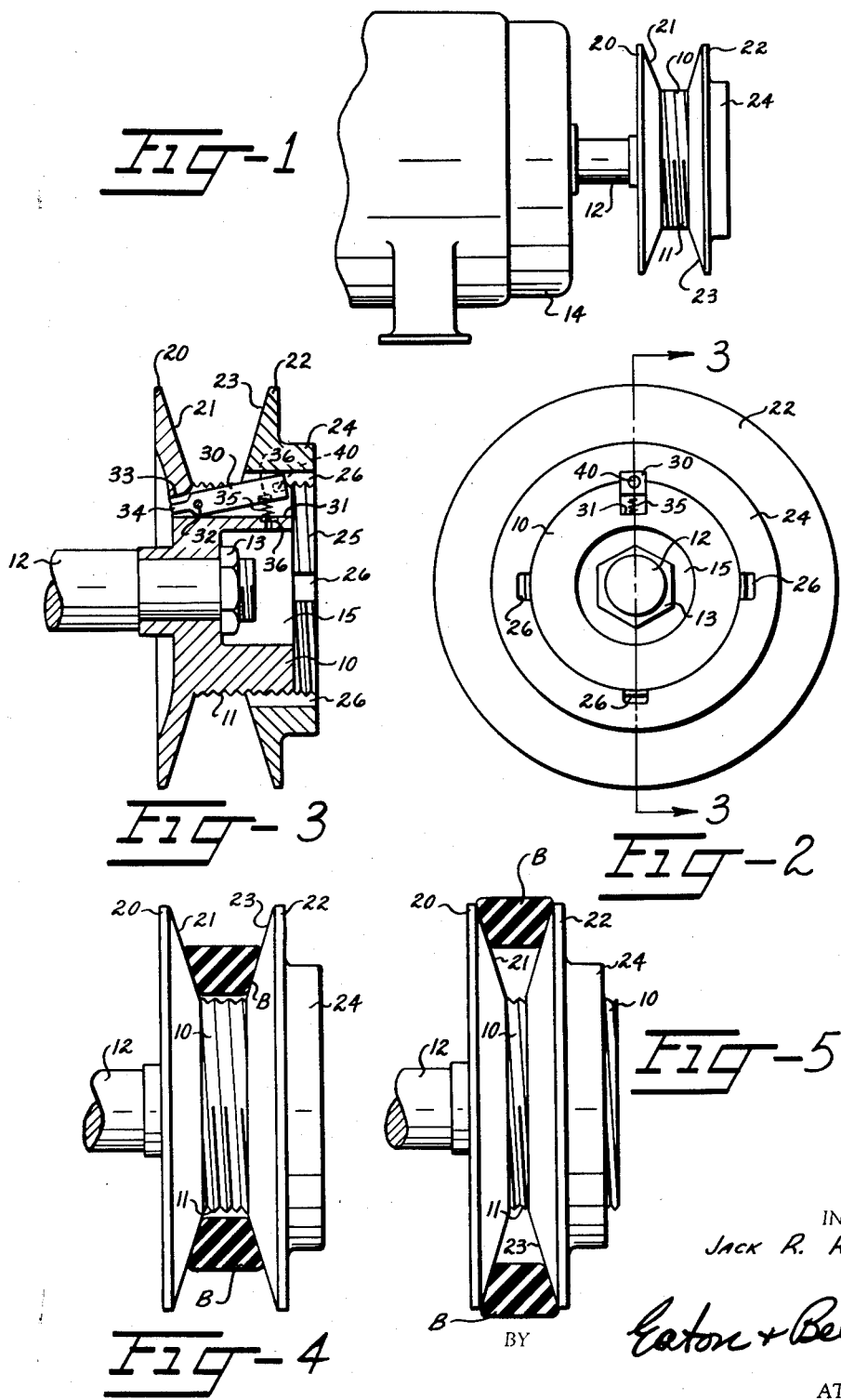

2,754,689

ADJUSTABLE PULLEY

Jack R. Ritz, Winston-Salem, N. C.

Application June 5, 1953, Serial No. 359,917

2 Claims. (Cl. 74—230.17)

This invention relates to improvements in pulleys of the variable speed type and more especially to an improved pulley embodying means facilitating adjustment of the flanges of the pulley to vary the effective diameter of the pulley.

It is the primary object of this invention to provide a pair of annular members having tapered proximal surfaces cooperating to form a V for the reception of a V-belt, which members are threadably interconnected to facilitate varying the distance therebetween and wherein an improved means is provided to automatically lock the said annular members in fixed relation to each other upon said members being adjusted to a predetermined distance therebetween.

More specifically, it is an object of this invention to provide a hub member having an annular flange on one end thereof, preferably integral therewith, and on which hub member a second annular flange is threadably mounted. The hub member has a longitudinally extending groove in the threaded portion thereof in which a key is positioned and mounted for radial movement. The inner periphery of the internally threaded second annular member has a plurality of circularly spaced keyways or grooves formed therein and the key is yieldably urged radially outwardly so that, upon any one of said keyways or grooves in the second annular member registering with the key, said key will be urged thereinto and will maintain the two annular flange members in predetermined spaced relation to each other.

It is another object of this invention to provide a pulley assembly of the character described wherein the key is pivoted at its end adjacent the first annular flange and is provided with means limiting outward movement thereof and also wherein the free end of said key is provided with a cavity for reception of any desired type of tool, such as a nail or screw driver, for moving the key inwardly while the hub member and the second annular member are being relatively rotated and whereupon said key may then be released and will snap into position in the next succeeding groove or keyway in the second annular member registering therewith.

Some of the objects of the invention having been stated, other objects will appear as the description proceeds, when taken in connection with the accompanying drawings in which—

Figure 1 is a fragmentary elevation of an electric motor or the like showing a shaft extending therefrom with the improved pulley assembly mounted thereon;

Figure 2 is an enlarged end elevation of the improved pulley assembly looking at the right-hand end of Figure 1;

Figure 3 is a transverse sectional view taken substantially along line 3—3 in Figure 2 and showing the improved key construction in elevation;

Figures 4 and 5 are side elevations of the improved pulley assembly showing the same adjusted in two different positions wherein the effective diameter of the pulley assembly is varied and also showing a V-belt mounted in the V groove of the pulley in cross-section.

Referring more specifically to the drawings, the numeral 10 indicates a hub member whose outer periphery is provided with threads 11 thereon. The hub 10 may be mounted on any suitable shaft, such as a shaft 12 having a nut 13 threadably mounted on its free end and which shaft, in this instance, extends from an electric motor 14. Preferably, the hub 10 is provided with a bore or cavity 15 in which the nut 13 is disposed. Of course, it is quite evident that the hub member 10 may be keyed or otherwise secured on the medial portion or end portion of a shaft in any desired manner without departing from the spirit of the invention.

One end of the hub 10 has a first peripheral or annular flange 20 thereon which is provided with a beveled inner face 21 which is spaced from a beveled inner face 23 of a second annular member 22. The annular member 22 has a second hub portion 24 integral therewith which is internally threaded, as at 25. The threads 25 mate with the threads 11 so the second annular flange 22 may be adjusted to and fro relative to the first annular flange 20.

The inner periphery of the hub member 24 and annular flange 22 is provided with a plurality of circularly spaced keyways or grooves 26 (Figures 2 and 3). Any desired number of keyways 26 may be provided depending upon the size of the pulley assembly, the pitch of the mating threads 11 and 25, etc. These keyways 26 may also be used to accommodate a suitable spanner wrench if so desired, although, when the pulley assembly is of a relatively small size, the operator may rotate the second flange member 22 relative to the first flange member 20 by grasping the outwardly projecting hub portion 24 and rotating the same, if so desired.

A radially movable key element 30 is carried by the hub member 10, and in this instance, the hub member 10 is provided with a longitudinally extending groove or keyway 31 in which the key element 30 has inward and outward radial movement. The key element 30 is pivoted in the groove 31 as at 32 adjacent the juncture of the beveled surface 21 of the first flange 20 with the threaded periphery 11 of the hub member 10. The flange 20 is provided with a relatively small opening 33 therethrough through which a relatively small tail portion 34, preferably integral with the key element 30, loosely extends.

It will be noted that the portion of the key element 30 which is pivoted at 32 is disposed entirely within the groove 31 so the outer surface of the key element 30 will not interfere with the interengagement of the threads 11 and 25 when the two flanges 20 and 22 are placed in relatively close proximity to each other as shown in Figure 5. On the other hand, the outer or free end of the key element 30 is normally urged radially outwardly by any suitable yielding means such as a compression spring 35. The proximal surfaces of the key element 30 and the bottom of the groove 31 each has a relatively small cavity 36 therein in which opposite ends of the compression spring 35 are disposed.

The free or outer end of the key element 30 has a relatively small tool engaging cavity 40 therein into which a suitable tool or instrument may be inserted for forcing the free end portion of the key element 30 inwardly in order to permit relative rotational movement between the hub member 10 and the hub member 24 when adjusting these members to vary the distance between the proximal beveled surfaces 21 and 23 of the flanges 20 and 22. The tail portion 34 is provided on the key element 30 in order to serve as a limiting means to limit outward movement of the free end portion of the key element 30, since the tail portion 34 will engage the bottom of the groove 31 when the second flange 22 and its hub member 24 are removed from the hub member 10.

Assuming that the pulley assembly is driving, and the parts of the pulley assembly are in the position shown in Figure 5, the key element 30 serves to prevent relative rotational movement between the two flanges 20 and 22, and the belt B rides on the beveled surfaces 21 and 23 of the respective flanges 20 and 22.

Now, assuming that it is desired to drive some driven member at a slow rate, the key 30 is moved radially inwardly by means of a suitable instrument or tool being inserted in the cavity 40, whereupon the second flange 22 and its hub member 24 are loosened and backed off to increase the distance between the proximal surfaces 21 and 23 of the flanges 20 and 22, as desired. The key element 30 is then released and if not adjacent a keyway 26, the hub member 24 is additionally rotated slightly to aline one of the keyways 26 in the inner periphery of the hub 24 with the key element 30, whereupon the key element 30 will snap outwardly into the corresponding keyway 26 and will thus be disposed partially in the groove 31 and partially in one of the keyways 26 to prevent further relative rotational movement between the two flanges 20 and 22 and whereupon the belt will then extend more fully into the V formed by the beveled proximal surfaces 21 and 23 of the respective annular flanges 20 and 22. Thus, the belts will therefore operate on a smaller effective pitch diameter.

It is thus seen that I have provided an improved pulley assembly wherein the displacement between the proximal surfaces 21 and 23 of the annular flanges 20 and 22 may be quickly adjusted without the necessity of tightening or loosening any type of fastening members other than effecting relative rotational movement between the hub members 10 and 24 and wherein spring pressed key means is provided for maintaining said pulley flanges in a desired position.

In the drawings and specification there has been set forth a preferred embodiment of the invention and although specific terms are employed, they are used in a generic and descriptive sense only, and not for purposes of limitation, the scope of the invention being defined in the claims.

I claim:

1. An adjustable pulley assembly mounted on a shaft for rotation and comprising an externally threaded hub connected to said shaft and having a first annular flange extending from adjacent one end thereof, a second annular flange having an internally threaded bore engageable with the hub to position the second flange in variable spaced relation to the first flange and the proximal surfaces of said flanges being provided with mating inclined surfaces, said hub having a longitudinally extending groove in its outer surface communicating with the end thereof remote from said first flange, a key disposed within the confines of the pulley assembly and pivotally connected at one end within the groove adjacent the first flange so that the other end portion of the key is free for radial movement into and out of the groove, the second annular flange having a plurality of circularly arranged keyways communicating with its threaded bore and with each end of the flange, said keyways being selectively registerable with the groove in the hub to receive the end portion of the key remote from the first flange to lock the flanges against relative rotational movement and said keyways being so arranged within said second flange as to accommodate a suitable spanner wrench for adjusting the second flange on the hub relative to the first flange, and the end portion of the key remote from the first flange being positively held within one of the keyways in the second flange by centrifugal force during rotation of the pulley assembly.

2. A structure according to claim 1, wherein resilient means normally urges the end portion of the key remote from the first flange radially out of the groove in the hub and into a keyway in the second flange positioned in communication with said groove.

References Cited in the file of this patent

UNITED STATES PATENTS

| 395,208 | Boyer | Dec. 25, 1888 |
| 775,433 | Werle | Nov. 22, 1904 |
| 947,069 | Weinel | Jan. 18, 1910 |
| 1,199,448 | Burnett | Sept. 26, 1916 |
| 1,709,539 | Poelman | Apr. 16, 1929 |
| 2,577,516 | Firth | Dec. 4, 1951 |

FOREIGN PATENTS

| 13,846 | Great Britain | of 1913 |
| 645,688 | France | July 3, 1928 |